(12) United States Patent  
Ardern

(10) Patent No.: US 6,474,012 B1  
(45) Date of Patent: Nov. 5, 2002

(54) CAST NET THROWING DEVICE

(76) Inventor: Paul C. Ardern, 1100 S. Lake Dr., Apartment No. 15, Lantana, FL (US) 33462

( * ) Notice: Subject to any disclaimer, the term of this patent is extended or adjusted under 35 U.S.C. 154(b) by 0 days.

(21) Appl. No.: 09/641,779

(22) Filed: Aug. 18, 2000

(51) Int. Cl.$^7$ .......................... A01K 73/00; A01K 74/00
(52) U.S. Cl. .................................. 43/8; 43/7
(58) Field of Search ........................................... 43/7, 8

(56) References Cited

U.S. PATENT DOCUMENTS

| | | | | |
|---|---|---|---|---|
| 568,252 A | * | 9/1896 | Holten | 43/8 |
| 876,148 A | | 1/1908 | Cloud | 43/8 |
| 1,154,563 A | * | 9/1915 | Dorsey | 43/8 |
| 2,565,955 A | * | 8/1951 | Dobreff | 43/7 |
| 2,723,481 A | | 11/1955 | Schwartz, Sr. | 43/7 |
| 3,213,560 A | | 10/1965 | Phillips | 43/7 |
| 4,607,448 A | | 8/1986 | Brief | 43/8 |
| 4,790,098 A | | 12/1988 | Lu | 43/7 |
| 5,979,100 A | | 11/1999 | Lee | 43/8 |

FOREIGN PATENT DOCUMENTS

FR             762264 B1  *  4/1934  ....................... 43/7

* cited by examiner

Primary Examiner—Darren W. Ark
(74) Attorney, Agent, or Firm—Donald R Bahr

(57) ABSTRACT

A cast net throwing device is provided for use with a cast net including a netting defining a mesh, with the netting being bounded at an outer periphery by a lead line, and the cast net further including a plurality of braille lines secured at opposite ends to the lead line and interconnected therebetween to a throwline, with the throwline and braille lines operating in combination with one another to close the net when a user pulls on the throwline. The cast net throwing device comprises at least one handle member, with the at least one handle member being operatively securable to the netting without interfering with the operation of the braille lines of the cast net. The at least one handle member is sized and configured to permit a user to grasp the member, thereby enhancing the user's ability to impart rotation to the cast net when the cast net throwing device is secured to the net and the throwing device and net are cast, whereby opening of the net during the cast is facilitated as a result of centrifugal forces acting on the net.

7 Claims, 16 Drawing Sheets

CAST NET THROWING DEVICE

BACKGROUND

1.0 Field of the Invention

The present invention relates generally to cast nets and, more particularly to a throwing device which may be secured to a cast net.

2.0 Related Art

Cast nets have been known in the art for quite some time and have been successfully used by fishermen to catch baitfish, shrimp etc. Cast nets may be used by fishermen standing on shore, wading into a body of water, or from a boat. Conventional cast nets comprise hand thrown nets which form a circle upon impact with the water if properly thrown. The size of conventional cast nets varies, with conventional nets typically having a radius of about three feet to about twelve feet for instance. Conventional cast nets are typically constructed of a monofiliment or nylon material configured to form a square mesh of varying sizes, depending upon the type of fish the fisherman wishes to catch. For instance, the mesh may vary from about one quarter inch square mesh to about one inch square mesh. Conventional nets typically include a weighted line, referred to in the art as a lead line, disposed about and attached to the periphery of the netting, which causes the cast net to sink after impact on the surface of the water.

Known cast nets also include a plurality of braille lines which extend diametrically across the netting, with opposite ends being attached to the lead line. Braille lines are further connected, at the approximate center of the netting, to one end of a throw line or rope via a variety of swivel devices which are known in the art.

After the cast net has been cast and has sunk to the bottom or the desired depth of the particular body of water, the fisherman may pull on the throw line which causes the net to be gathered, thereby capturing baitfish, etc. within the net. The net may then be retrieved by drawing in the throw line.

Although cast nets have been used successfully for quite some time, they typically are somewhat difficult to throw in the proper fashion so that they are spread into a circular shape upon impact with the water, particularly for inexperienced fishermen.

Furthermore, it is sometimes difficult to cast the cast nets a sufficient distance from the fisherman. Various techniques are known in the art for throwing or casting cast nets, which if followed correctly, greatly facilitate the proper casting of the nets. However, even these techniques can be awkward, and somewhat difficult to follow, especially for an inexperienced fisherman. For instance, various known techniques include multiple steps requiring the fisherman to hold the throw line in one hand, while draping the cast net over the opposite arm, after subdividing the net into various portions, placing a portion of the lead line between his teeth, and then throwing the net with the proper motion. As may be appreciated, an undesirable result often occurs, with the cast net hitting the water without being fully opened. Additionally, with some of the known techniques, the fisherman is required to grasp a portion of the netting of the cast net. This often results in the fisherman's fingers of the casting hand becoming entangled with the net during the cast, which impedes the proper opening of the net during the cast.

In view of the foregoing difficulties associated with conventional cast nets, there remains a need for a device which facilitates the casting or throwing of cast nets.

SUMMARY

In view of the foregoing needs, the present invention is directed to a simple and inexpensive cast net throwing device which may be secured, in a simple manner, to the netting of a cast net, thereby significantly enhancing the ability of the fisherman to cast the net in such a manner that the net opens fully upon impact with the surface of the water. This may be accomplished because the cast net throwing device is sized and configured to permit the fisherman to grasp the throwing device and the device is substantially centered on the net, thereby enhancing the fisherman's ability to impart rotation to the cast net, when the throwing device is secured to the net and the net and throwing device are cast. Accordingly, opening of the net during the cast is facilitated as a result of centrifugal forces acting on the net. Since the cast net throwing device is substantially centered on the net, when secured to the netting, the centrifugal forces are substantially evenly distributed throughout the net. Closing of the cast net is not impeded by the cast net throwing device, since the device is secured to the netting of the cast net without interfering with the operation of the braille lines of the cast net, which act in combination with a throwline to close the net when the fisherman exerts a pulling force on the throwline. The cast net throwing device may be provided separately, which permits existing cast nets to be retrofitted or alternatively, the cast net throwing device may be provided with, and secured to, a new cast net. Additionally, the inventor has observed that use of the cast net throwing device of the present invention allows a fisherman to react quicker, i.e., to cast a cast net incorporating the cast net throwing device in a shorter period of time, in reaction to the appearance of a school of baitfish for instance, since incorporation of the cast net throwing device simplifies casting of the net. Furthermore, the inventor has observed that incorporation of the cast net throwing device significantly enhances a fisherman's ability to accurately cast the net to a desired location.

According to a first aspect of the present invention, a cast net throwing device is provided for use with a cast net including a netting defining a mesh, with the cast net exhibiting a substantially circular shape when fully open and the netting being bounded at an outer periphery by a lead line. The cast net further includes a plurality of braille lines secured at opposite ends to the lead line and interconnected therebetween to a throwline, with the throwline and braille lines operating in combination with one another to close the net when the fisherman pulls on the throwline. The cast net further includes an annular thimble which is substantially centrally disposed relative to the netting and is secured to the netting, with the annular thimble defining an aperture therethrough for accepting the braille lines and including an outside diameter. The cast net throwing device comprises at least one handle member, with the at least one handle member being operatively securable to the netting, without interfering with the operation of the braille lines of the cast net. The at least one handle member is substantially centrally disposed on the cast net when the cast net throwing device is secured to the netting. The at least one handle member is sized and configured to permit the user to grasp the member, thereby facilitating the user's ability to impart rotation to the cast net when the device is secured to the net and the device and net are cast, whereby opening of the net during the cast is facilitated as a result of centrifugal forces acting on the net as stated previously.

According to one embodiment, the at least one handle member comprises a first ring member which includes a radially inner surface defining an inside diameter which is greater than an outside diameter of the thimble of the cast net. The first ring member further includes a radially outer surface and an annular channel defined by the radially outer surface. In this embodiment, the cast net throwing device further comprises a binding material, which may comprise twine, rope or the like, with the first ring member being securable to the netting of the cast net with the binding material. During installation of the cast net throwing device, a portion of the netting disposed radially outwardly of the cast net thimble is draped across the annular channel of the first ring member. The binding material is then wrapped around this portion of the netting which forces the portion of netting into the annular channel and secures the ring member to the netting. In this embodiment, the first ring member may comprise a split-ring member having opposing circumferentially facing ends disposed in abutting relationship with one another and defining an interface therebetween. In this event, the cast net throwing device may further comprise an arcuate connecting member which is disposed in abutting relationship with the radially inner surface of the first ring member. The arcuate connecting member is fixedly attached to the first ring member by conventional means such as riveting. Alternatively, the cast net throwing device may comprise a continuous ring member. In either event, the ring member is substantially concentrically disposed relative to the thimble of the cast net so that when rotation is imparted to the cast net, the cast net may be caused to rotate about the center of the net so that centrifugal forces are substantially, evenly distributed throughout the cast net which facilitates the opening of the net during the cast.

In this embodiment, the first ring member may be made of aluminum or a variety of other materials including other metals, metallic alloys, plastic materials, glass filled nylon material such as 30% glass filled nylon, and other composite materials, provided the alternate materials exhibit sufficient strength to withstand the centrifugal forces acting upon the ring and the size and configuration of the ring in combination with the material allows the ring and net to sink in either fresh or salt water bodies.

In another embodiment, the cast net throwing device further comprises a second ring member having a radially inner surface and a radially outer surface, with the second ring member comprising a split-ring, clamping member having first and second circumferentially facing ends. Each of the ends define a radially extending flange having an aperture extending therethrough, with the apertures being effective for receiving fasteners therethrough. In this embodiment the split-ring, clamping member is used in lieu of the binding material to secure the first ring member to the netting. After a portion of the netting has been draped across the annular channel of the ring member, the clamping member is positioned in the annular channel and secured with fasteners which captures the portion of the netting between the first ring member and the split-ring member within the annular channel. In this embodiment, the first ring member and the split-ring, clamping member may be made of a glass filled nylon material, or of the other materials discussed with respect to the foregoing embodiment.

In yet another embodiment, the at least one handle member of the cast net throwing device comprises first and second split-ring members, with the inside diameter of one of the split-ring members being substantially the same as the outside diameter of the other split-ring member and the two split-ring members being disposed in substantially concentric relationship with one another, and with the thimble of the cast net, when the cast net throwing device is secured to the netting of the cast net, such that a portion of the netting disposed radially outwardly of the thimble of the cast net is captured between the two split-ring members. The two split-ring members may be secured to one another by fasteners which pass through circumferentially spaced apertures in each split-ring member, which are aligned with one another. In this embodiment, the split-ring members may be formed from aluminum bar stock material. However, other alternative materials may be used as discussed previously.

In yet another embodiment, the at least one handle member of the cast net throwing device comprises a pair of elongate members which are disposed proximate opposite surfaces of the netting of the cast net and are attached to one another wherein a portion of the netting of the cast net is captured between the first and second elongate members. Each of the elongate members include a central ring portion defining a substantially circular aperture extending therethrough and a pair of elongated portions extending outwardly from the central ring portion. The central ring portion of the upper elongate member is disposed in surrounding relationship with the thimble of the cast net and the substantially circular apertures of each of the elongate members are preferably substantially concentrically disposed with the thimble thereby substantially centering the cast net throwing device with respect to the cast net. One of the elongate members, which is disposed proximate the underneath surface of the netting of the cast net, includes a slot extending through the central ring portion of the elongate member which is effective for receiving the braille lines of the cast net. Accordingly, when the elongate members are attached to one another and secured to the netting of the cast net, the elongate members do not interfere with the operation of the braille lines of the cast net. If this were not true, the ability to close the cast net would be impeded or prevented. None of the embodiments of the cast net throwing device of the present invention impede the operation of the braille lines of the cast net. The elongate members of this embodiment may be made of aluminum, other metals or metallic alloys, plastic materials or composite materials.

According to a second aspect of the present invention, a cast net is provided which includes a netting defining a mesh and a lead line, with the netting being bounded at an outer periphery by the lead line. The cast net further includes a throwline having first and second ends and a plurality of braille lines secured at opposite ends to the lead line and interconnected therebetween to the throwline. The throwline and braille lines operate in combination with one another to close the net when a user pulls on the throwline. The cast net further includes an annular thimble which is substantially centrally disposed relative to the netting and is secured to the netting, with the annular thimble defining an aperture therethrough for accepting the braille lines and including an outside diameter. The cast net further includes a cast net throwing device comprising at least one handle member, with the cast net throwing device being secured to the netting of the cast net without interfering with the operation of the braille lines of the cast net. The at least one handle member is substantially centrally disposed on the cast net. The at least one handle member is sized and configured to permit the user to grasp the member, thereby enhancing the user's ability to impart rotation to the cast net when the cast net is cast, whereby opening of the cast net during the cast is facilitated as a result of centrifugal forces acting on the net. The cast net throwing device may comprise any of the embodiments discussed previously, with regard to the first aspect of the present invention. Additionally, the at least one handle member of the cast net throwing device may comprise a wide variety of devices other than those discussed previously.

BRIEF DESCRIPTION OF THE DRAWINGS

These and other features, aspects and advantages of the present invention will become better understood with regard to the following description, appended claims and accompanying drawings, wherein:

DETAILED DESCRIPTION

Figure 1:
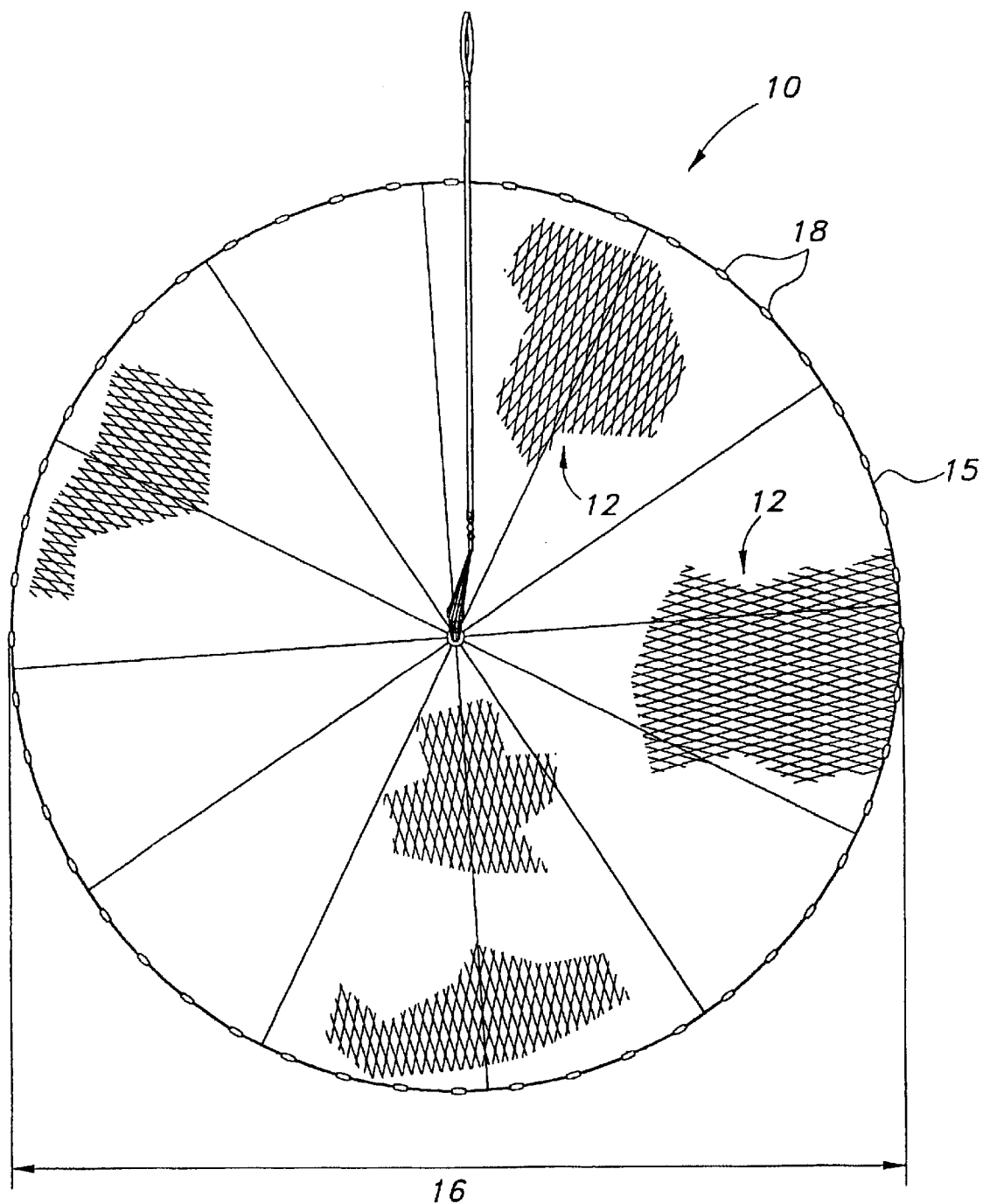
FIG. 1 is a plan view illustrating a prior art cast net.
Figure 2:
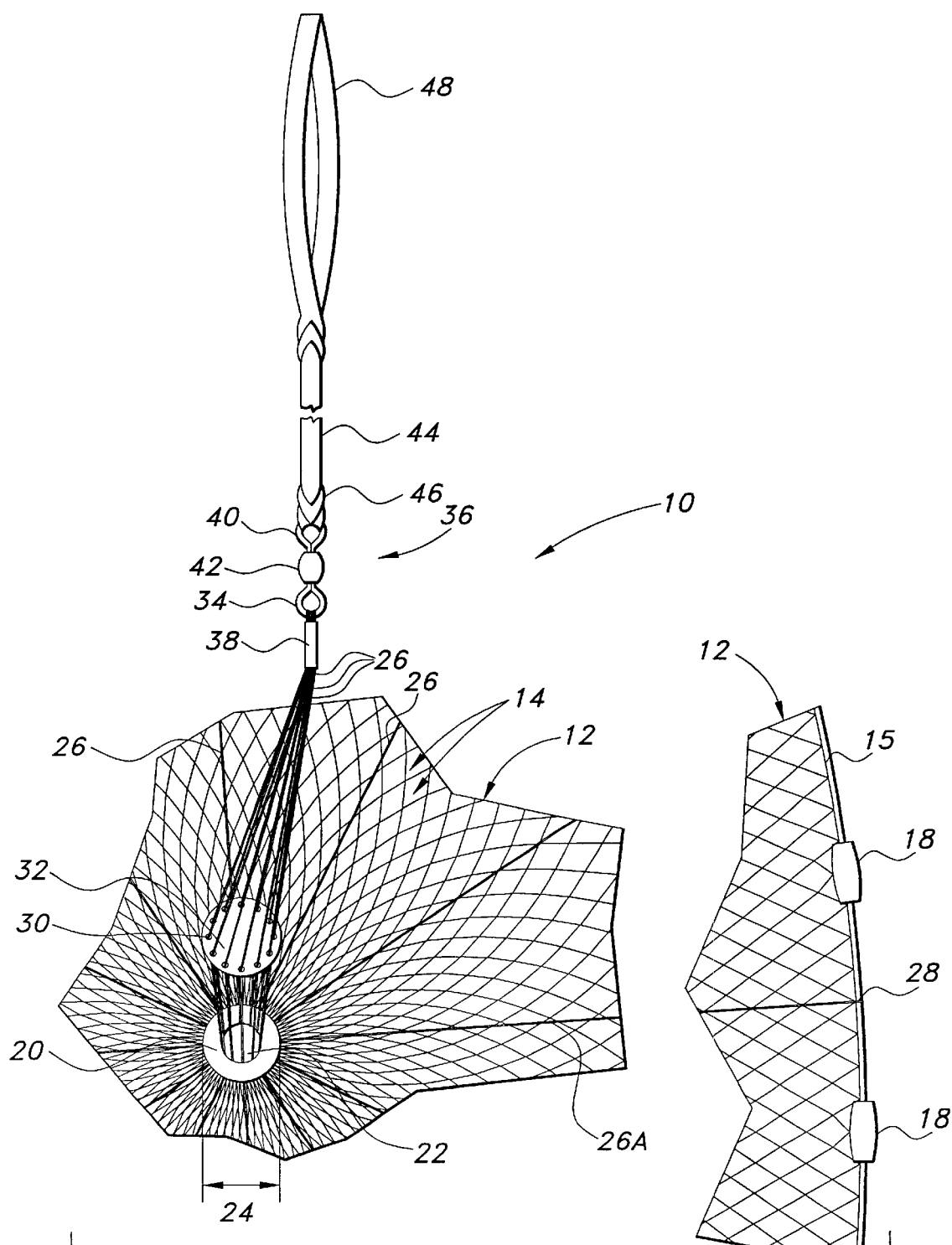
FIG. 2 is an enlarged plan view further illustrating portions of the prior art cast net shown in FIG. 1.

Referring now to the drawings, wherein like reference numerals have been used for similar elements throughout, FIG. 1 is a plan view illustrating a prior art cast net 10 and FIG. 2 is an enlarged, fragmentary plan view further illustrating portions of the prior art cast net 10 shown in FIG. 1. Cast net 10 includes a netting, indicated generally at 12, which is typically made of monofilament or nylon material, as known in the art. Netting 12 is illustrated at various portions of net 10 in FIG. 1 for ease of illustration, but it should be understood that netting 12 extends throughout net 10 as known in the art. Netting 12 defines a mesh 14 which corresponds to each of the openings defined by the monofilament or nylon material used to construct netting 12. The mesh 14 may typically be square mesh, of varying sizes, ranging from about one quarter inch square mesh to about one inch square mesh, for instance. However, the netting 12 may define other sizes of mesh 14. The particular mesh size may vary with application, depending upon the desired size of baitfish the fisherman wishes to catch.

As shown in the plan view of FIG. 1, when the cast net 10 is fully open, it exhibits a substantially circular shape, with the netting 12 being bounded at an outer periphery thereof by a lead line 15 which forms the outer perimeter of cast net 10. When fully open, as shown in FIG. 1, the cast net 10 has an outside diameter 16 which may vary in magnitude. For instance, conventional cast nets such as cast net 10 may have a diameter 16 ranging from about six feet to about 24 feet, for instance. However, cast net 10 may have a different diameter. The lead line 15 may be constructed of tightly braided polypropylene with a polyethylene inner core construction, or may be made from other materials which exhibit substantially equivalent strength, flexibility and durability. The lead line 15 is attached to netting 12 at each of a plurality of locations disposed about the periphery of cast net 10, by an assembly line (not shown) which is wrapped around both the lead line 15 and a portion of the netting 12 and is tied or otherwise secured. The assembly lines may comprise nylon thread or twine, or equivalent material. As best seen in FIG. 2, cast net 10 includes a plurality of weights 18 having a hollow interior to accept lead line 15, with each of the weights 18 being secured in position to lead line 15 by thread, twine or the like, made of various materials. The purpose of the weights 18 is to cause the cast net 10 to sink after being cast upon the surface of a body of water. As known in the art, the quantity of weights 18 may vary, as well as the total weight of weights 18, depending on the particular size of the cast net and the desired sinking rate. In this regard, nets such as cast net 10 may be categorized as having a predetermined number of pounds of weights per radius foot of the cast net.

The cast net 10 further includes an annular member 20, referred to in the art as a thimble, which is substantially centrally disposed relative to the netting 12 and is secured to the netting 12. The annular thimble 20 defines an aperture 22 extending through the thimble 20, and thimble 20 includes an outside diameter 24 which may typically be about 1 ½ inches to 2 inches. Thimble 20 is typically made of plastic. When the cast net 10 is fully opened and is resting upon a flat surface, the central portion of the netting 12 may be slightly raised or gathered, which is typically referred to in the art as the horn of the cast net 10. The thimble 20 is attached to the netting 12 in the area of the centrally disposed horn. The particular construction of thimbles is well known in the art, as well as the manner in which netting 12 is secured to the thimble 20. For instance, netting 12 may be wrapped, tied and bonded, such as with glue, to the thimble 20 which may comprise a two piece construction to facilitate the attachment of netting 12 to thimble 20, as known in the art.

Cast net 10 also includes a plurality of braille lines 26 which are effective for facilitating the closing of cast net 10 as subsequently discussed. Each braille line 26 is secured at a first end to the lead line 15. For instance, one end of the braille line 26A shown in FIG. 2 is secured to lead line 15 at location 28. Typically, the braille lines 26 are tied to the lead line 15, with the use of appropriate knots (not shown). Each braille line 26 then extends, in a substantially radial direction beneath the netting 12 to the center of cast net 10, with the braille lines 26 then extending upward through the aperture 22 defined by thimble 20, as shown in FIG. 2. Each braille line 26 then passes through an aperture 30 formed in a disc member 32, typically referred to in the art as a spacer, which is effective for preventing the braille lines 26 from becoming tangled with one another for smooth operation of cast net 10. The spacer 32 may be constructed of a plastic or composite material. Each braille line 26 then passes upward through a first eyelet 34 and extends downward, passing through an opposite one of the holes 30 formed in spacer 32, downward through the aperture 22 formed in thimble 20 and radially outwardly beneath netting 12 where it is secured to the lead line 15 at a second, substantially opposite location in the manner discussed previously. Accordingly, each of the braille lines 26 includes first and second ends secured to the lead line 15 at substantially, diametrically opposed locations, with the approximate middle of each braille line 26 passing through eyelet 34 of swivel member 36. For instance, braille line 26A is secured at one end to lead line 15 at location 28, with the opposite end of the braille line 26A being secured to lead line 15 at a position which is substantially diametrically opposite location 28. As shown in FIG. 2, the cast net further includes a clasp 38, positioned below eyelet 34 of swivel member 36, which secures the braille lines 26 together at this location.

Swivel member 36 further includes a second eyelet 40, with both of the eyelets 34 and 40 being secured to a barrel member 42 of swivel device 36. The particular construction of swivel device 36, including the manner in which eyelets 34 and 40 are attached to barrel member 42, is well known in the art. The cast net 10 further includes a throwline 44 which is secured at a first end 46 to the eyelet 40 of swivel member 36. The opposite end of throwline 44 defines a loop 48 which may be passed over the wrist of the fisherman using cast net 10. Braille lines 26 are interconnected with throwline 44 via swivel member 36. After cast net 10 has been cast and sunk below the surface of the water, the fisherman may close the net 10 by pulling on throwline 44 thereby capturing baitfish, shrimp, etc. within net 10. The throwline 44 operates in combination with braille lines 26 to close the cast net 10.

Figure 3:
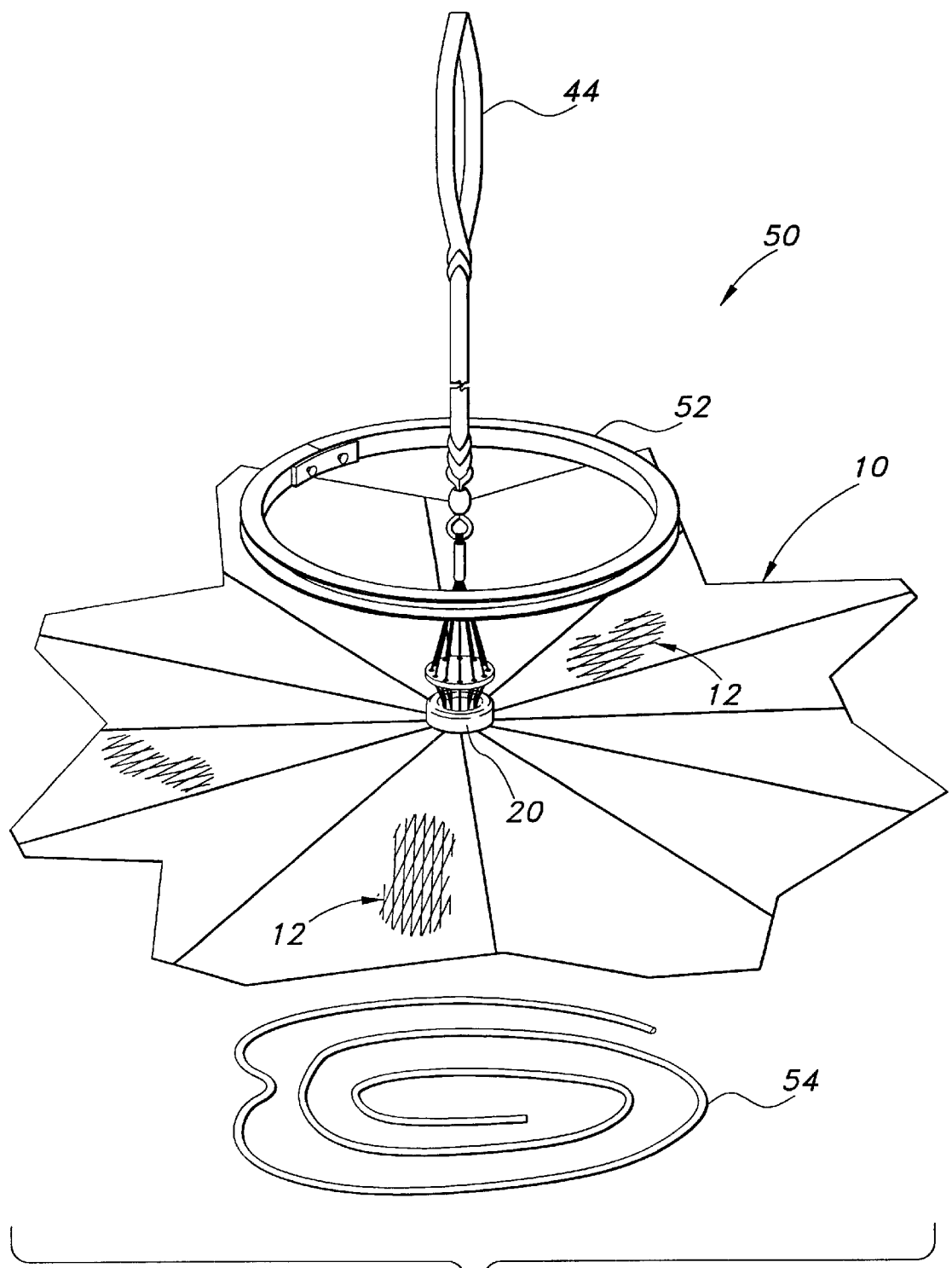
FIG. 3 is an exploded, assembly perspective view illustrating a first embodiment of the cast net throwing device according to the present invention, and a portion of the cast net shown in FIGS. 1 and 2.
Figure 4:
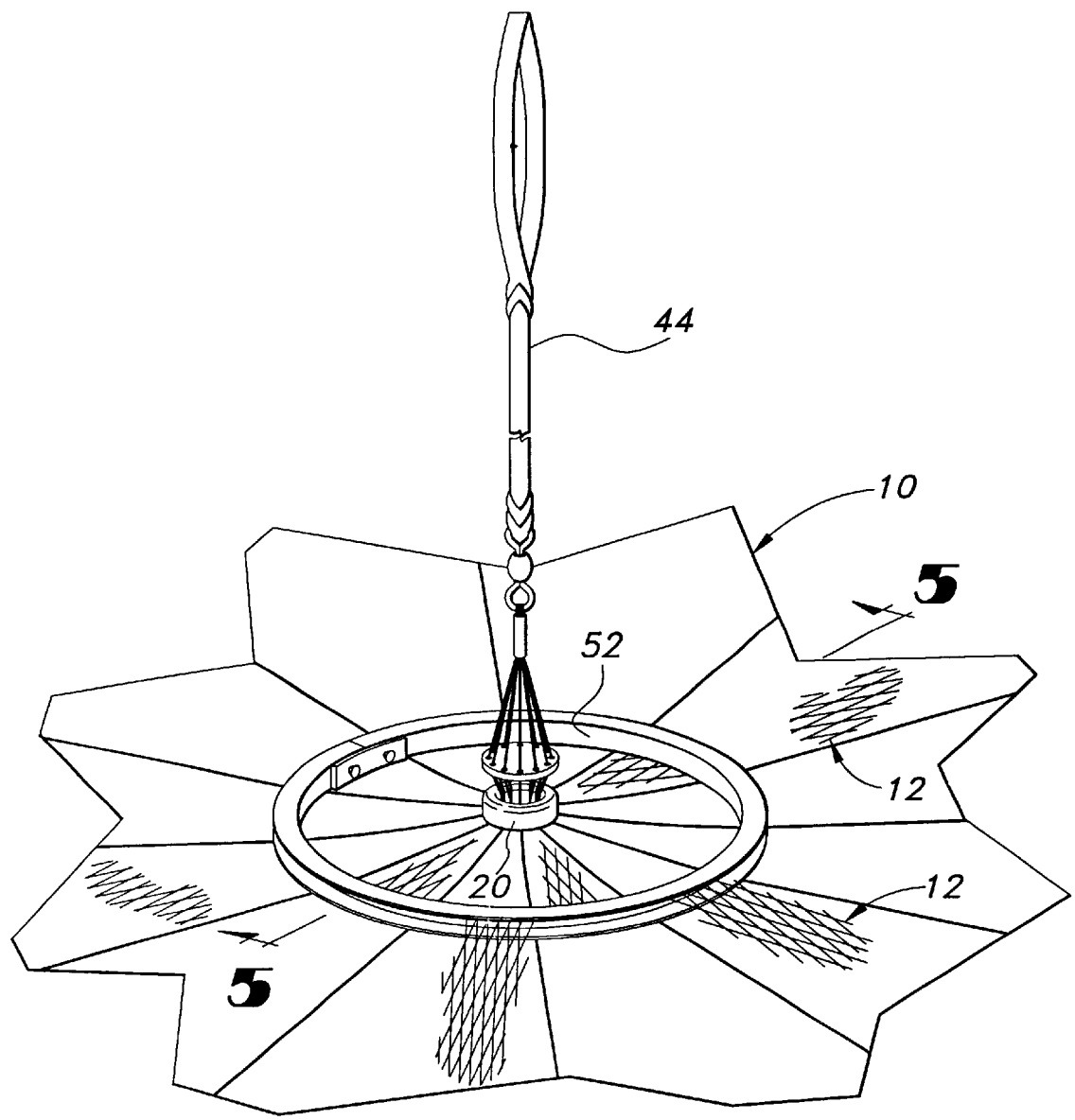
FIG. 4 is a perspective view of the cast net throwing device and net shown in FIG. 3 but with the cast net throwing device secured to the net.
Figure 5:
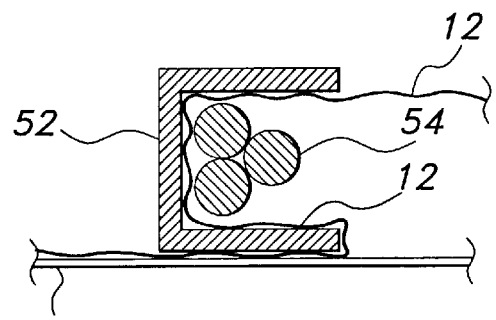
FIG. 5 is a cross-sectional view taken along line 5—5 in FIG. 4.
Figure 6:
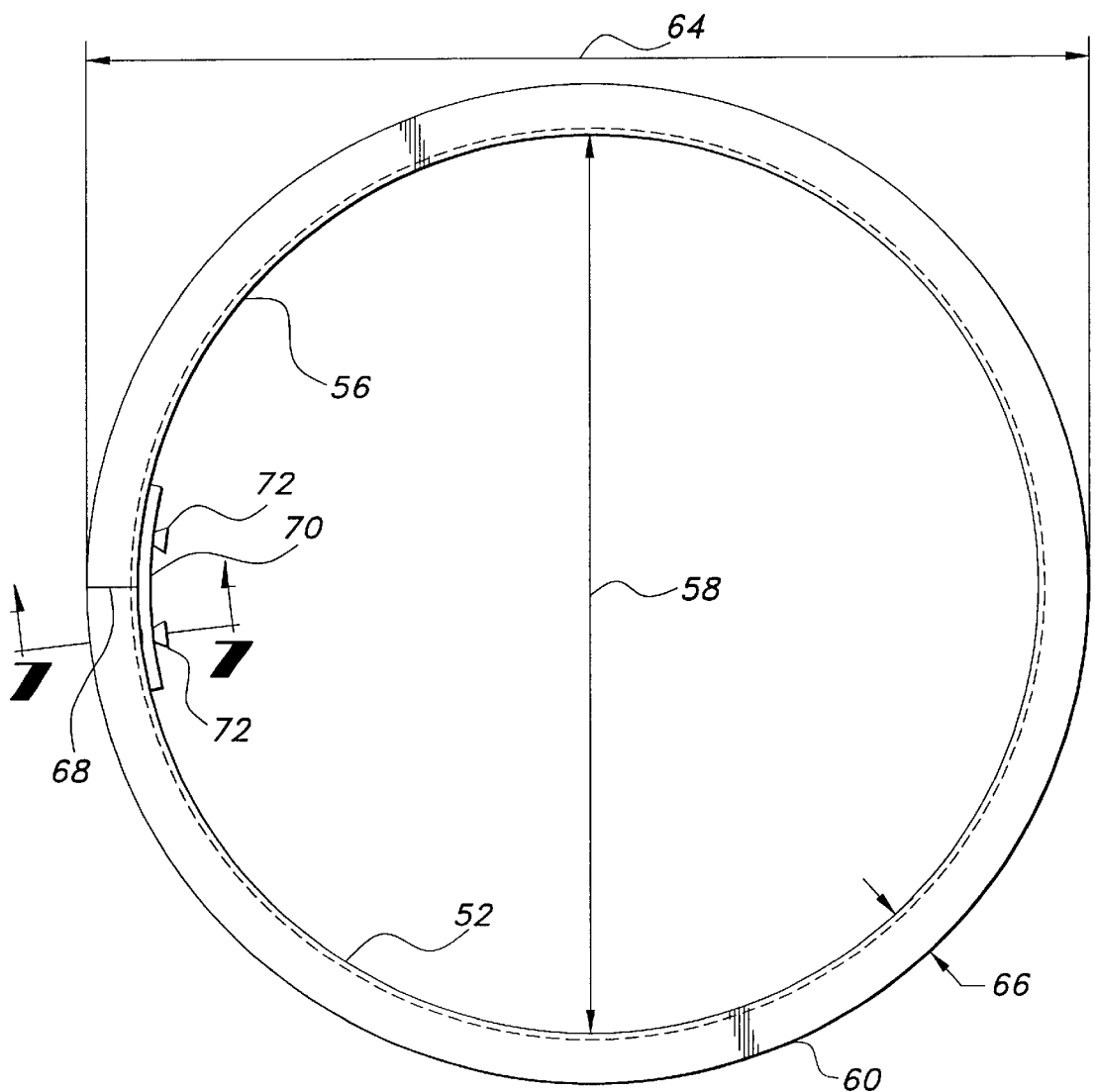
FIG. 6 is a plan view of a portion of the cast net throwing device shown in FIGS. 3 and 4.
Figure 7:
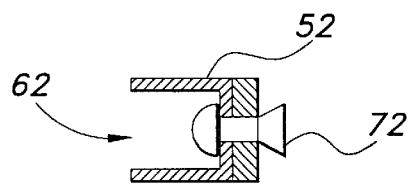
FIG. 7 is a cross-sectional view taken along line 7—7 in FIG. 6.

FIG. 3 is an exploded assembly, perspective view illustrating a cast net throwing device 50, according to a first embodiment of the present invention, and a portion of the previously discussed cast net 10. As shown in FIG. 3, the cast net throwing device 50 includes a handle member comprising a ring member 52 and also includes a binding material 54. The ring member 52 is secured to the netting 12 of the cast net 10 with binding material 54, as subsequently discussed and as illustrated in FIGS. 4 and 5. FIGS. 6 and 7 further illustrate the ring member 52. Ring member 52 includes a radially inner surface 56 which defines an inside diameter 58 which is greater than, and preferably substantially greater than, the outside diameter 24 of the annular thimble 20 of cast net 10. Ring member 52 further includes a radially outer surface 60 defining an annular channel 62 as best seen in the cross-sectional view illustrated in FIG. 7. The radially outer surface 60 also defines an outside diameter 64 and ring member 52 includes a radial height 66 corresponding to the difference between the outside diameter 64 and the inside diameter 58 of ring member 52. In one embodiment, the inventor has observed that the cast net throwing device 50 may be advantageously used with cast nets having a wide range of diameters, with ring member 52 having an outside diameter 64 of about ten inches, a radial height 66 of about one half inch, and an inside diameter 58 of about nine inches. However, the particular values of outside diameter 64, radial height 66 and inside diameter 58 may vary within the scope of the present invention and the foregoing illustrative values of these features are provided as an illustrative example and should not be construed to limit the scope of the present invention. The inventor has further determined that a minimum value for the inside diameter 58 of ring member 52 may be about six inches so that a fisherman may comfortably grasp the ring member 52. Additionally, the maximum value of the outside diameter 64 may vary greatly, provided that the difference between the diameter of the cast net 10 and the outside diameter 64 of ring member 52 is sufficiently large to permit proper closing of the net 10, i.e., that there is sufficient netting material disposed between ring member 52 and lead line 15. In view of the foregoing, it may be appreciated that the overall size and configuration of the ring member 52 permits a fisherman to easily grasp ring member 52 which significantly enhances the fisherman's ability to impart rotation to the cast net 10, so as to facilitate the opening of cast net 10, during a cast. As may be appreciated, ring member 52 is significantly larger than the annular thimble 20 of cast net 10, which typically has an outside diameter of about one and one half inches for instance and is not suitable for grasping so as to facilitate the opening of cast net 10 during a cast.

In the illustrative embodiment, ring member 52 comprises a split-ring member having opposing circumferentially facing ends disposed in abutting relationship with one another and defining an interface 68 therebetween, as best seen in FIG. 6. The cast net throwing device 50 further includes an arcuate connecting member 70 disposed in abutting relationship with the radially inner surface 56 of ring member 52. Furthermore, the arcuate connecting member 70 extends circumferentially on either side of the interface 68 of ring member 52. Connecting member 70 is fixedly attached to the ring member 52, thereby strengthening ring member 52 and preventing the circumferentially facing ends of ring member 52 from separating. In the illustrative embodiment, connecting member 70 is attached to ring member 52 via a plurality of rivets 72. However, connecting member 70 may be attached to ring member 52 by other conventional fasteners or alternatively may be welded, brazed or otherwise bonded to ring member 52. Additionally, connecting member 70 may comprise an arcuate channel member which is fixedly attached to ring member 52 as shown in FIGS. 6 and 7. Although ring member 52 comprises a split-ring member in the illustrative embodiment, ring member 52 may alternatively comprise a circumferentially continuous ring member. In this event, the connecting member 70 may be omitted.

The binding material 54 may comprise twine, braided thread or rope, or the like, made of various materials, which are suitable for securing the ring member 52 to the netting 12 of cast net 10. In one preferred embodiment, ring member 52 may be made of aluminum. However, ring member 52 may alternatively be made of other metals, metallic alloys, plastic materials or composite materials provided the overall size and configuration of ring member 52 in combination with the material selected permits ring member 52 and net 10 to sink below the surface of the body of water upon which the device is cast (either fresh or salt water) and the material is strong enough to withstand the centrifugal forces acting on ring member 52, when ring member 52 is secured to net 10. Additionally, any alternative material for ring member 52 should be water resistant and should substantially retain its characteristics when exposed to fresh or salt water.

The cast net throwing device 50 is suitable for retrofitting to an existing cast net 10 as illustrated in FIGS. 3–5 and as subsequently discussed. The ring member 52 is disposed above an upper surface of the netting 12 of cast net 10, with the throwline 44 being passed through ring member 52 as shown in FIG. 3. This position is important to note since it allows ring member 52 to be secured to the netting 12 of cast net 10, without interfering with the operation of the braille lines 26 of cast net 10. Since there is no circumferentially extending gap formed in ring member 52, which would be effective for receiving braille lines 26 and allowing braille lines 26 to be disposed within the interior of ring member 52, ring member 52 cannot be installed by positioning ring member 52 below the netting 12 of cast net 10. Ring member 52 is then disposed in substantially concentric relationship with the annular thimble 20 of cast net 10, which substantially centers the ring member 52 on cast net 10. An annular portion of the netting 12, which is disposed radially outwardly of the thimble 20 is secured within the annular groove 62 of the ring member 52, preferably substantially around the entire periphery of ring member 52 with binding material 54. The binding material 54 is wrapped around the netting 12 disposed within the annular channel 62, as shown in FIG. 5, with opposite ends of the binding material being tied or otherwise secured to one another which secures the ring member 52 to the netting 12 of cast net 10. The binding material 54 does not interfere with braille lines 26. FIG. 4 is a perspective view and FIG. 5 is a cross-sectional view illustrating ring member 52 secured to the netting 12 of cast net 10.

The inventor has determined that a fixture (not shown in FIG. 3), which may comprise a common household device such as a five gallon bucket, may significantly facilitate the operations required to secure ring member 52 to the netting 12 of cast net 10. For instance, the inventor has found it useful to position such a fixture on a work surface and then to place ring member 52 against the fixture, with the cast net 10 draped over the ring member 52. This corresponds to the ring member 52 and cast net 10 being rotated 180 degrees from the position shown in FIG. 3. In this position, the braille lines 26 of cast net 10 are exposed and the netting 12 of cast net 10 is effectively draped over the annular groove 62 providing easy access for installing binding material 54 thereby securing ring member 52 to the netting 12 of cast net 10.

It should be further understood that, although cast net throwing device 50 may be used to retrofit existing cast nets such as cast net 10, the cast net throwing device 50 may alternatively be provided as part of a new cast net. This also applies to the remaining, subsequently discussed embodiments of the cast net throwing device according to the present invention.

Figure 8:
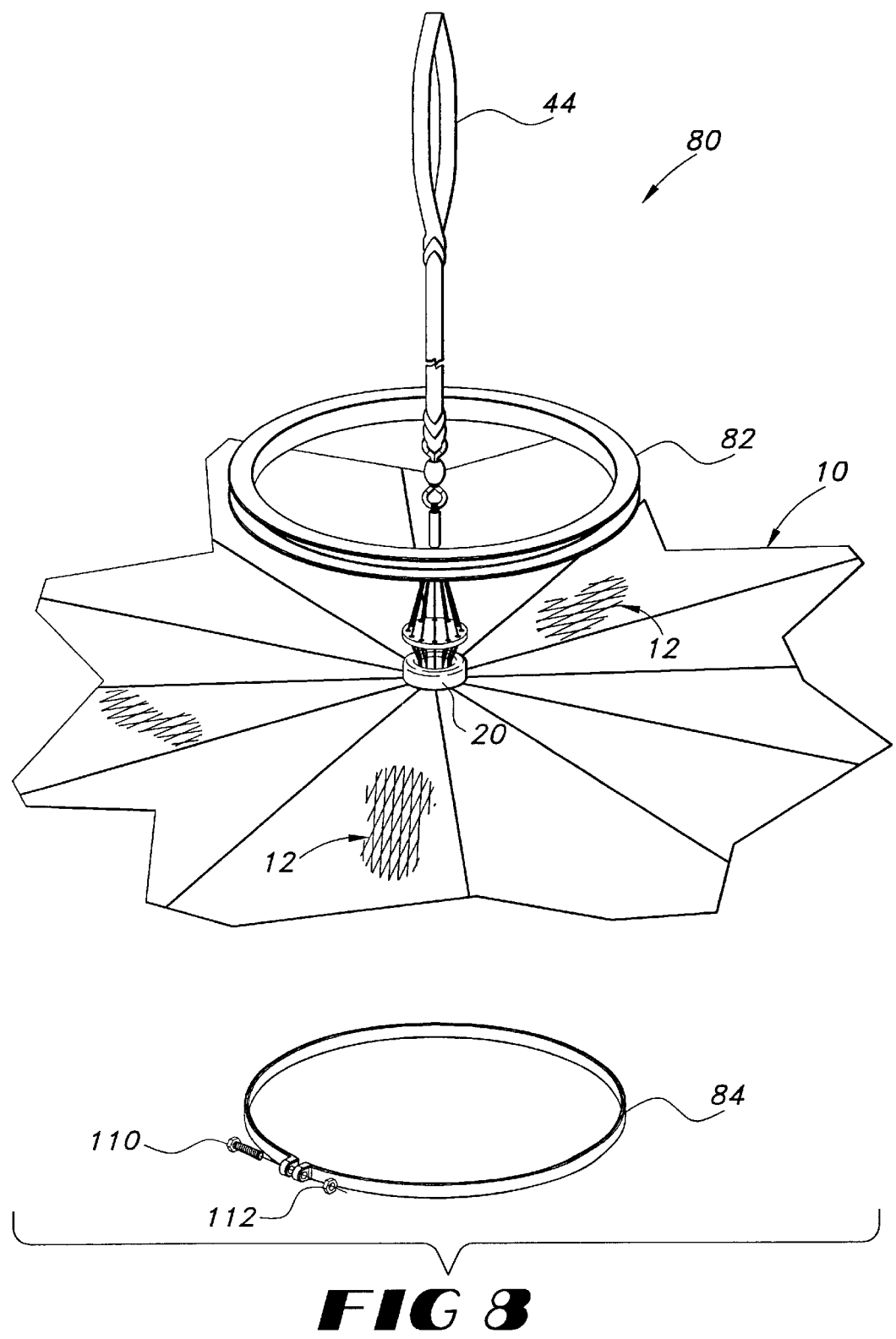
FIG. 8 is an exploded assembly, perspective view illustrating a second embodiment of the cast net throwing device according to the present invention, with a portion of the cast net shown in FIGS. 1 and 2.
Figure 9:
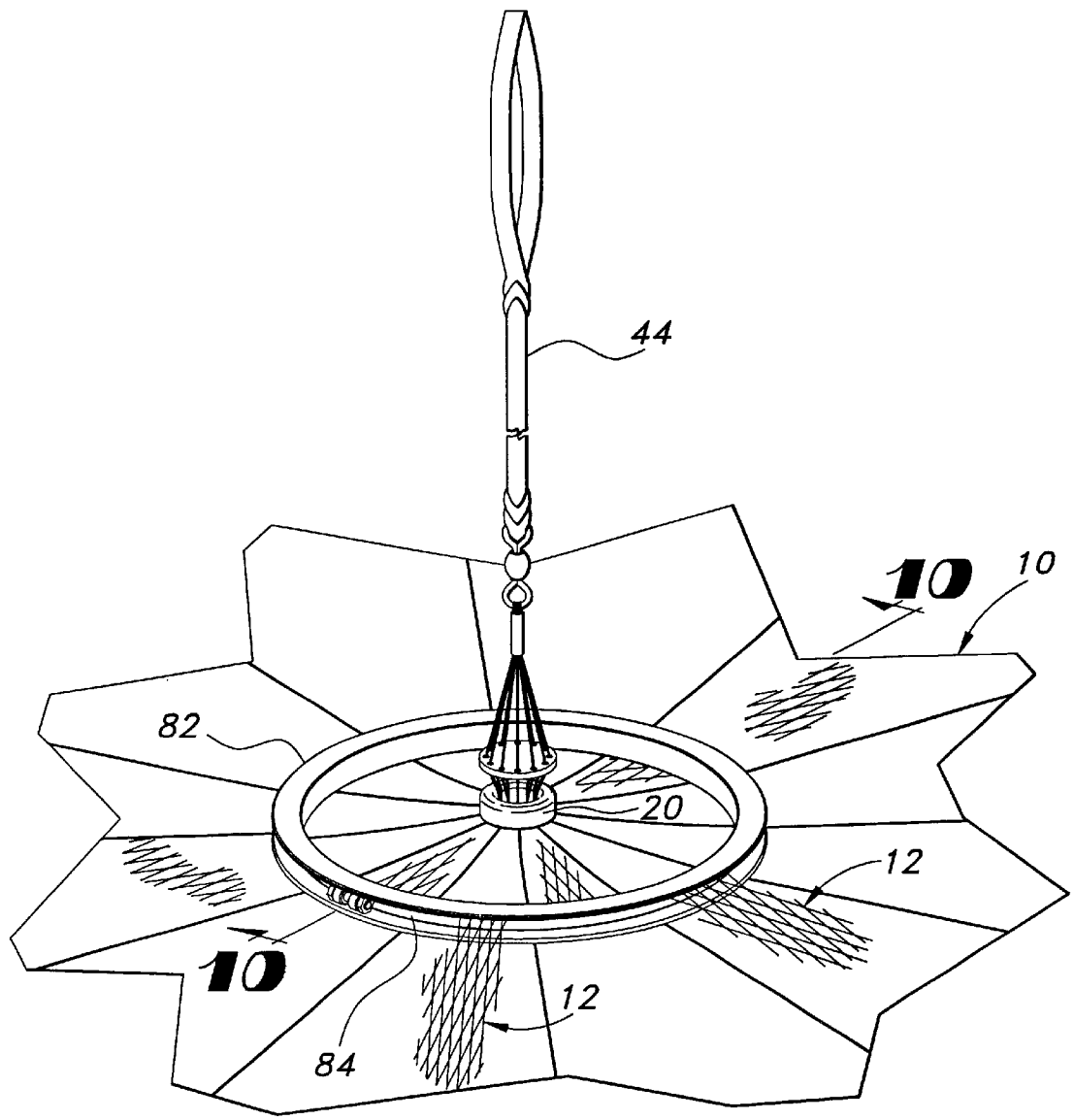
FIG. 9 is a perspective view illustrating the cast net throwing device and cast net shown in FIG. 8, but with the cast net throwing device secured to the net.
Figure 10:
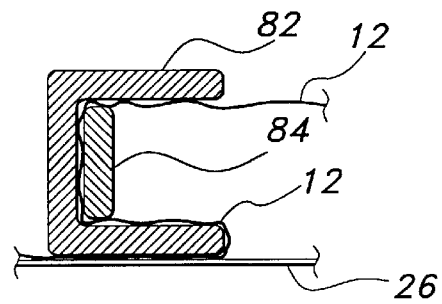
FIG. 10 is a cross-sectional view taken along line 10—10 in FIG. 9.
Figure 14:
FIG. 14 is a side elevation view of the ring shown in FIG. 13.
Figure 15:
FIG. 15 is a cross-sectional view taken along line 15—15 in FIG. 13.

FIG. 8 is an exploded assembly, perspective view illustrating a cast net throwing device 80, according to a second embodiment of the present invention, and a portion of the previously discussed cast net 10. As shown in FIG. 8, the cast net throwing device 80 includes a handle member comprising a first ring member 82, which is a circumferentially continuous ring member. Cast net throwing device 80 further includes a second ring member 84, comprising a split-ring, clamping member. FIGS. 9 and 10 illustrate the cast net throwing device 80 secured to the netting 12 of the cast net 10, while FIGS. 11–12 further illustrate the ring member 82 and FIGS. 13–15 further illustrate the ring member 84.

Figure 11:
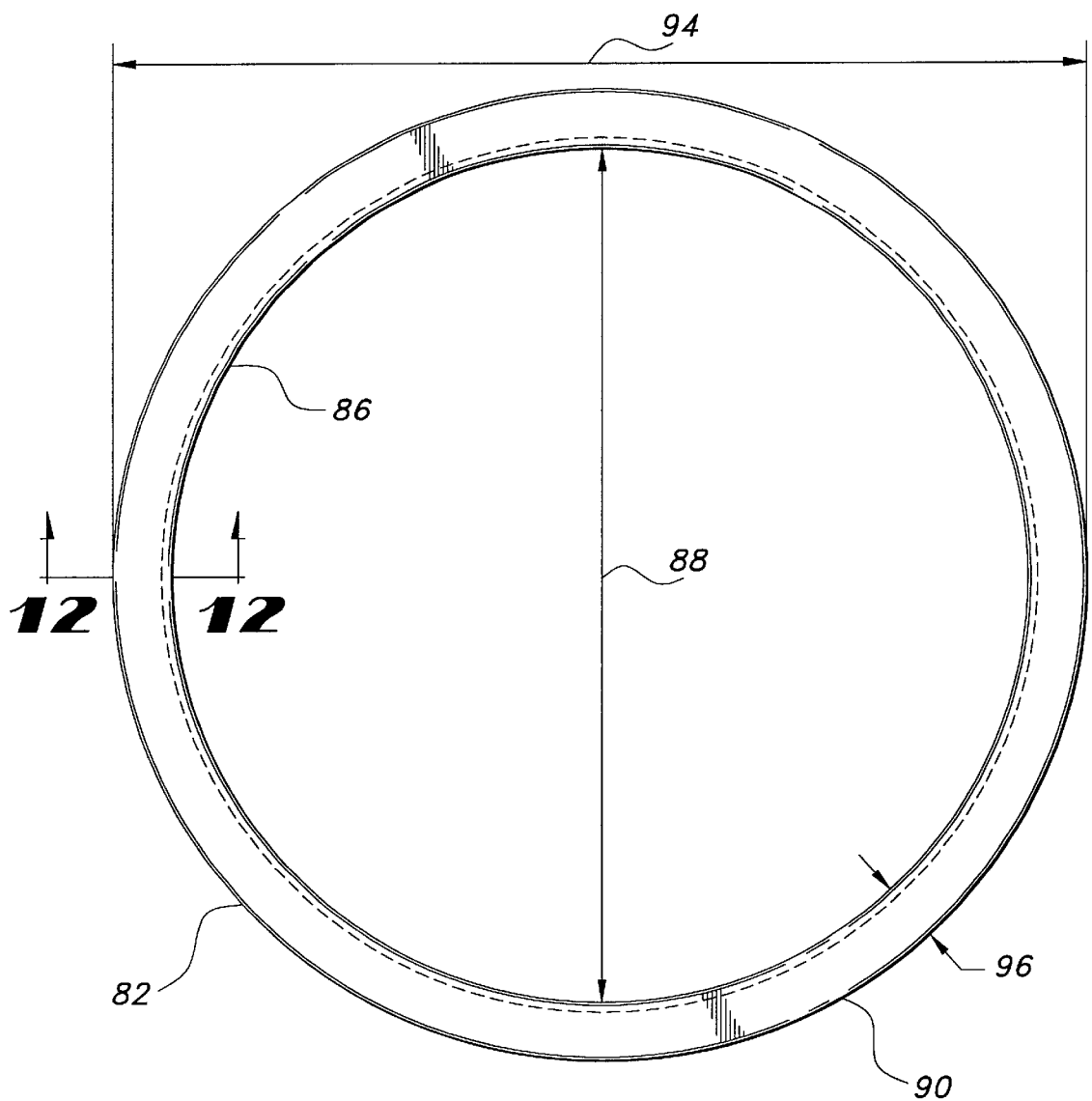
FIG. 11 is a plan view illustrating one of the rings of the cast net throwing device shown in FIGS. 8–10.
Figure 12:
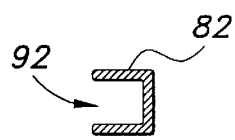
FIG. 12 is a cross-sectional view taken along line 12—12 in FIG. 11.

As best seen in FIG. 11, ring member 82 includes a radially inner surface 86 defining an inside diameter 88 of ring member 82, and further includes a radially outer surface 90 which defines an annular channel 92, as best seen in FIG. 12. The radially outer surface 90 also defines an outside diameter 94 of ring member 82. Ring member 82 further includes radial height 96 which comprises the difference between the outside diameter 94 and the inside diameter 88 of ring member 82. Inside 88 and outside 94 diameters of ring member 82, as well as the radial height 96 of ring member 82 may have sizes similar to those discussed previously with respect to ring member 52 of cast net throwing device 50. In one preferred embodiment, ring member 82 may be made of a glass fill nylon material, such as thirty percent glass fill nylon material. However, ring member 82 may alternatively be made of any of the materials of construction discussed in conjunction with ring member 52, provided the material is sufficiently strong to withstand the centrifugal forces acting on ring member 82 and provided that ring member 82 and net 10 may sink below the surface of a body of water (either fresh or salt water) when ring member 82 is secured to cast net 10. Additionally, any alternative material for ring member 82 should be water resistant and should substantially retain its characteristics when exposed to fresh or salt water.

Figure 13:
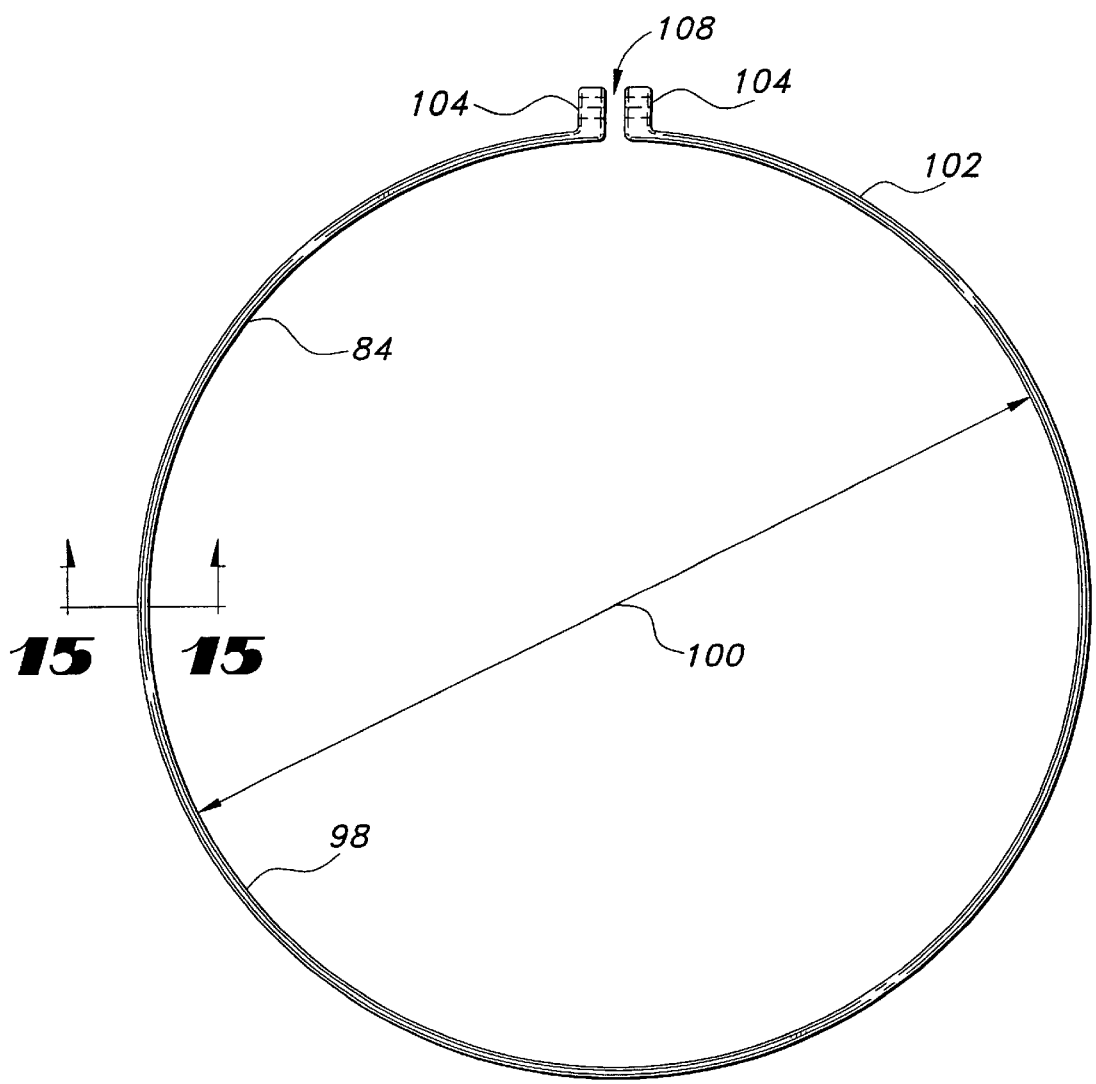
FIG. 13 is a plan view of a second ring of the cast net throwing device illustrated in FIGS. 8–10.

The split-ring, clamping member 84 has a radially inner surface 98 which defines an inside diameter 100 which is sufficiently large to permit the clamping member 84 to be disposed within the annular channel 92 of ring member 82. The split-ring, clamping member 84 further includes a radially outer surface 102 and first and second circumferentially facing ends, each defining a radially extending flange 104 having an aperture 106 extending therethrough. The flanges 104 are separated by a gap 108, when the split-ring, clamping member 84 is in a free-state condition as shown in FIG. 13. The split-ring, clamping member 84 may be made of the same materials as discussed previously with respect to ring member 82 of the cast net throwing device 80.

The cast net throwing device 80 may be secured to the netting 12 of the cast net 10 by passing the throwline 44 through ring member 82 and positioning ring member 84 proximate the underneath side of net 10 as shown in FIG. 8. A substantially annular portion of the netting 12, which is disposed radially outwardly from the thimble 20 of cast net 10 is then forced into the annular channel 92 of ring member 82, preferably substantially around the entire periphery of ring member 82. The split-ring, clamping member 84 is then disposed within the annular channel 92, radially outwardly from the netting 12, with the radially extending flanges 104 of clamping member 84 being secured to one another by conventional fasteners such as bolt 110 and nut 112 shown in FIG. 8. A fixture (not shown) may be used to facilitate securing cast net throwing device 80 to the netting 12 of cast net 10, in a manner similar to that discussed previously with respect to cast net throwing device 50.

Figure 16:
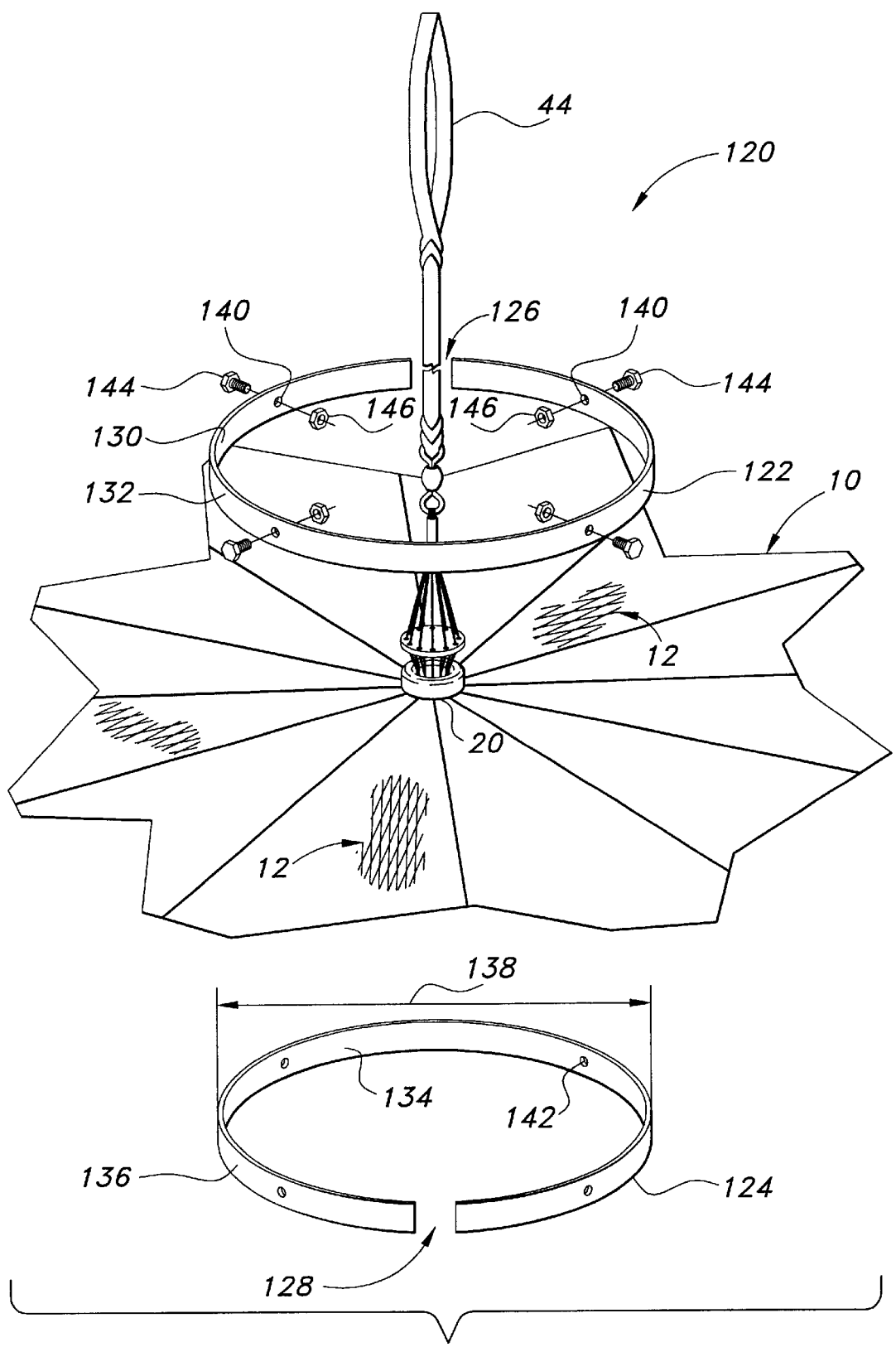
FIG. 16 is an exploded assembly, perspective view illustrating a cast net throwing device according to a third embodiment of the present invention, and a portion of the cast net shown in FIGS. 1 and 2.
Figure 17:
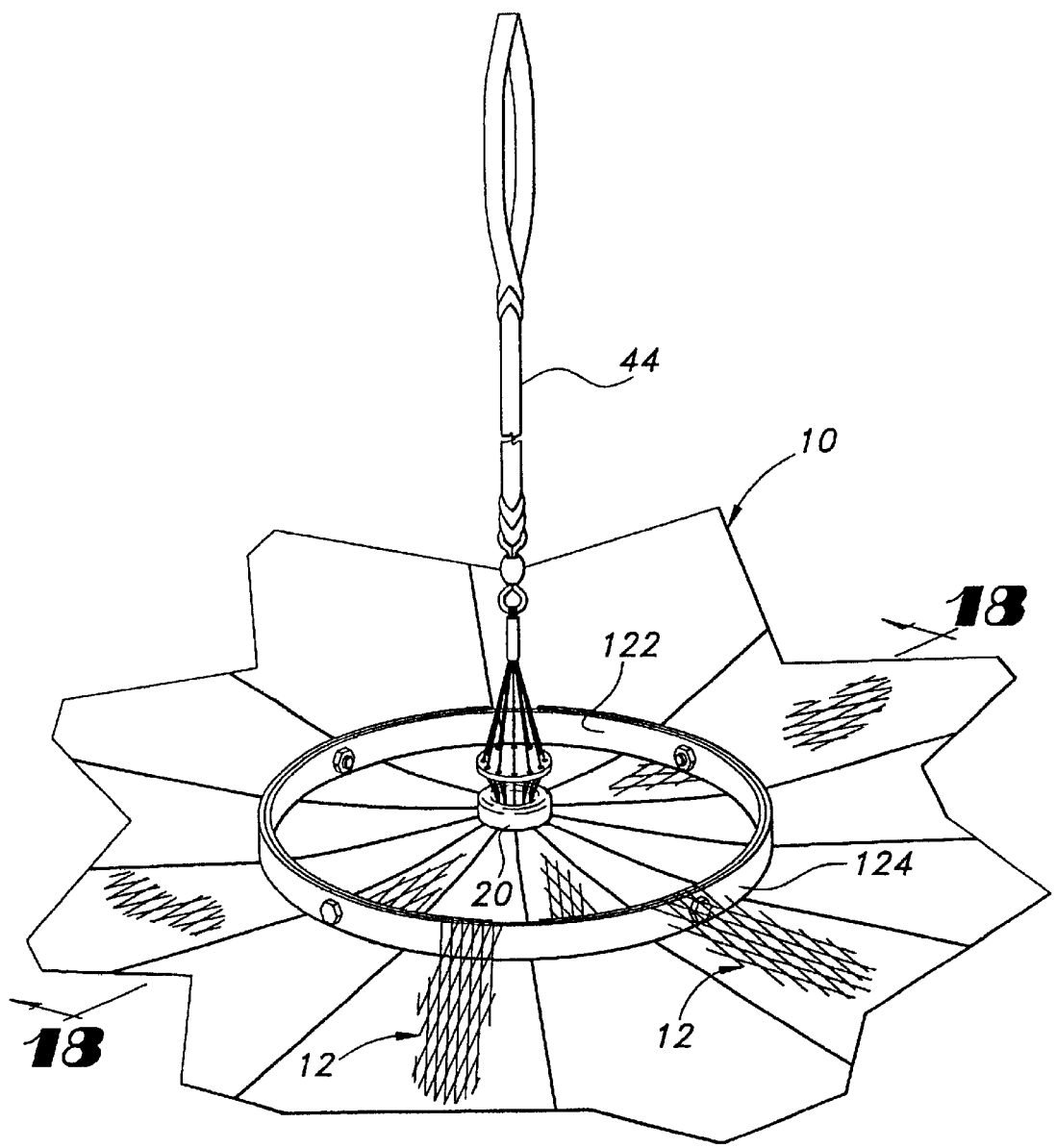
FIG. 17 is a perspective view illustrating the cast net throwing device and cast net shown in FIG. 16, but with the cast net throwing device secured to the net.
Figure 18:
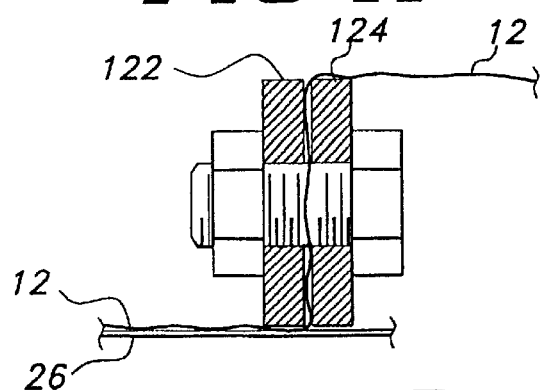
FIG. 18 is a cross-sectional view taken along line 18—18 in FIG. 17.

FIG. 16 is an exploded assembly, perspective view illustrating a cast net throwing device 120, according to a third embodiment of the present invention, and a portion of the previously discussed cast net 10. As shown in FIG. 16, the cast net throwing device 120 includes two handle members comprising a first ring member 122 and a second ring member 124. Ring members 122 and 124 are secured to one another and to the netting 12 of the cast net 10 as subsequently discussed, and as illustrated in FIGS. 17 and 18. As shown in FIG. 16, each of the ring members 122 and 124 comprise split-ring members having circumferentially facing ends which are separated by gaps 126 and 128, respectively. As shown in FIG. 16, ring member 124 may be installed from the underneath side of netting 12 of cast net 10. Ring member 124 may be so positioned because of the gap 128 which is effective for permitting the braille lines 26 of the cast net 10 to pass into the interior of ring 124, so that the operation of the braille lines 26 will not be impeded when ring members 122 and 124 are secured to cast net 10.

Ring member 122 includes a radially inner surface 130 defining an inside diameter and a radially outer surface 132 defining an outside diameter. Similarly, ring member 124 includes a radially inner surface 134 defining an inside diameter of ring member 124 and a radially outer surface 136 defining an outside diameter 138 of ring member 124. Ring member 122 includes a plurality of circumferentially spaced apertures 140 which may comprise substantially round holes and are effective for receiving fasteners therethrough. Similarly, ring member 124 includes a plurality of circumferentially spaced apertures 142, which may also comprise substantially round holes. As may be appreciated from FIGS. 16 and 17, ring members 122 and 124 are very similar in construction. However, ring member 122 is slightly smaller than ring member 124. For instance, in one embodiment, the inside diameter of the ring member 124 is substantially the same as the outside diameter of ring member 122 so that ring member 122 maybe nested within ring member 124 when the cast net throwing device is secured to the netting 12 of cast net 10 but will permit a substantially annular portion of the netting 12 to be securely captured between ring members 122 and 124.

In one embodiment, ring members 122 and 124 are formed from aluminum bar stock material. However, ring members 122 and 124 may be made of other metals, metallic alloys, plastic materials or composite materials provided that the use of the alternate materials results in ring members 122 and 124 having sufficient strength and permitting ring members 122 and 124 and net 10 to sink when members 122 and 124 are secured to cast net 10, as discussed with regard to the previous embodiments of the present invention. Additionally, any alternative material for ring members 122 and 124 should be water resistant and should substantially retain its characteristics when exposed to fresh or salt water. Ring members 122 and 124 may have diametrical sizes which are comparable with the size of ring member 52 discussed previously.

The cast net throwing device 120 is secured to the netting 12 of cast net 10 as subsequently discussed, and this operation may be facilitated by use of a fixture if desired as discussed previously. The ring member 122 is positioned against the upper surface of the netting 12 of cast net 10, while ring member 124 is aligned with ring member 122 and positioned against the underneath surface of the netting 12. Preferably, both ring members 122 and 124 are substantially concentrically disposed with respect to the thimble 20 of cast net 10 which substantially centers ring members 122 and 124 on net 10. Additionally, one of the ring members 122 and 124 is rotated as required to align the apertures 140 in ring member 122 with the apertures 142 of ring member 124. Force is then exerted on one of the ring members 122 and 124 so that ring member 124 is disposed radially outwardly of ring member 122. The nesting of ring member 122 within ring member 124 is facilitated since each of the members 122 and 124 comprises a split ring member. The shearing action of this operation forces a substantially annular portion of the netting 12 which is disposed radially outwardly of thimble 20 between ring members 122 and 124, thereby capturing this portion of the netting 12 between the radially inner surface 134 of ring member 124 and the radially outer surface 132 of ring member 122. The ring members 122 and 124 are then secured to one another by conventional fasteners, such as bolts 144 which pass through the aligned holes 140 in ring member 122 and holes 142 in ring member 124, and nuts 146 which secure the bolts 144 in position. Alternatively, holes 140 and 142 may comprise tapped holes and bolts 144 may be replaced with sheet metal screws, with nuts 146 being omitted. In the installed position, both ring members 122 and 124 are disposed in surrounding relationship with thimble 20 of cast net 10. Although the positioning of ring members 122 and 124 may be as shown in FIGS. 16–18, the positioning of ring members 122 and 124 may be reversed so that ring member 122 may be installed from the underneath side of netting 12 of cast net 10.

As shown in FIG. 18, braille lines 26 are not captured between ring members 122 and 124. Accordingly, the operation of braille lines 126 is not impeded when the cast net throwing device 120 is secured to the netting 12 of cast net 10. Also, with regard to the substantially annular portion of netting 12 which is captured between ring members 122 and 124, it may be appreciated that this portion of the netting 12 is displaced from the thimble 20 by a radial distance which is sufficiently large that the netting 12 may be forced between ring members 122 and 124.

Figure 19:
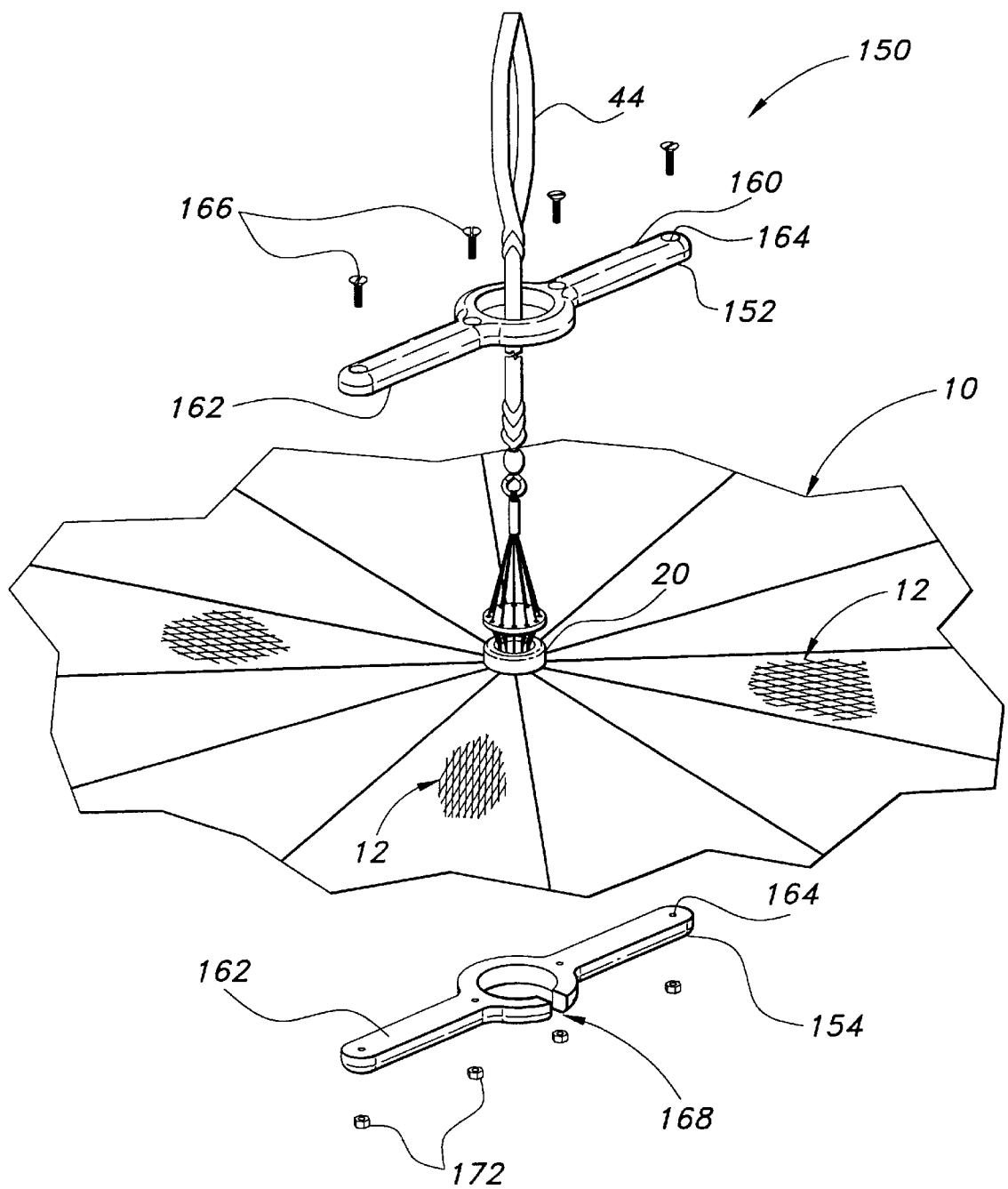
FIG. 19 is an exploded assembly, perspective view of a cast net throwing device according to a fourth embodiment of the present invention, and a portion of the cast net shown in FIGS. 1 and 2.
Figure 20:
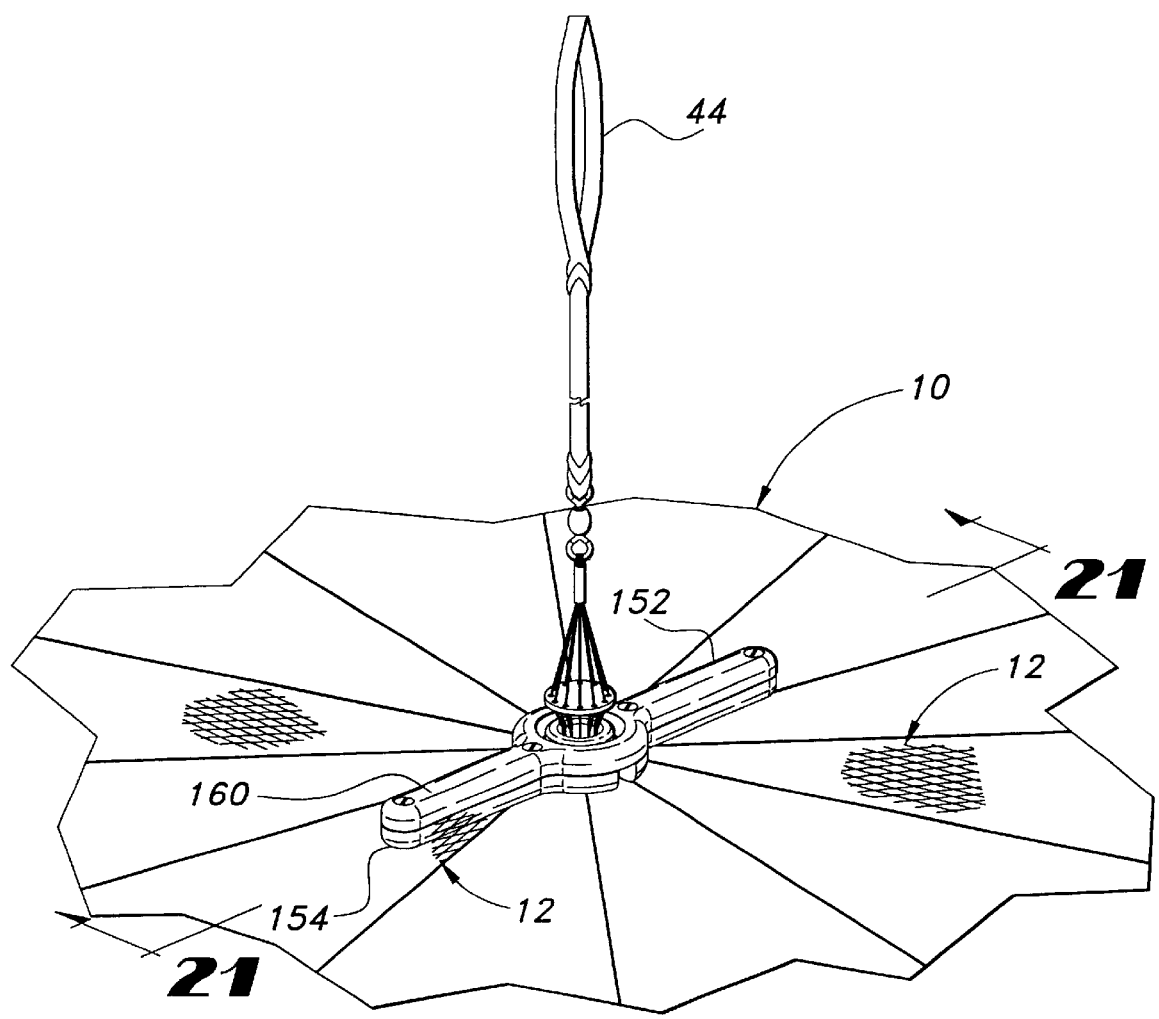
FIG. 20 is a perspective view illustrating the cast net throwing device and cast net shown in FIG. 19, but with the cast net throwing device secured to the net.
Figure 21:
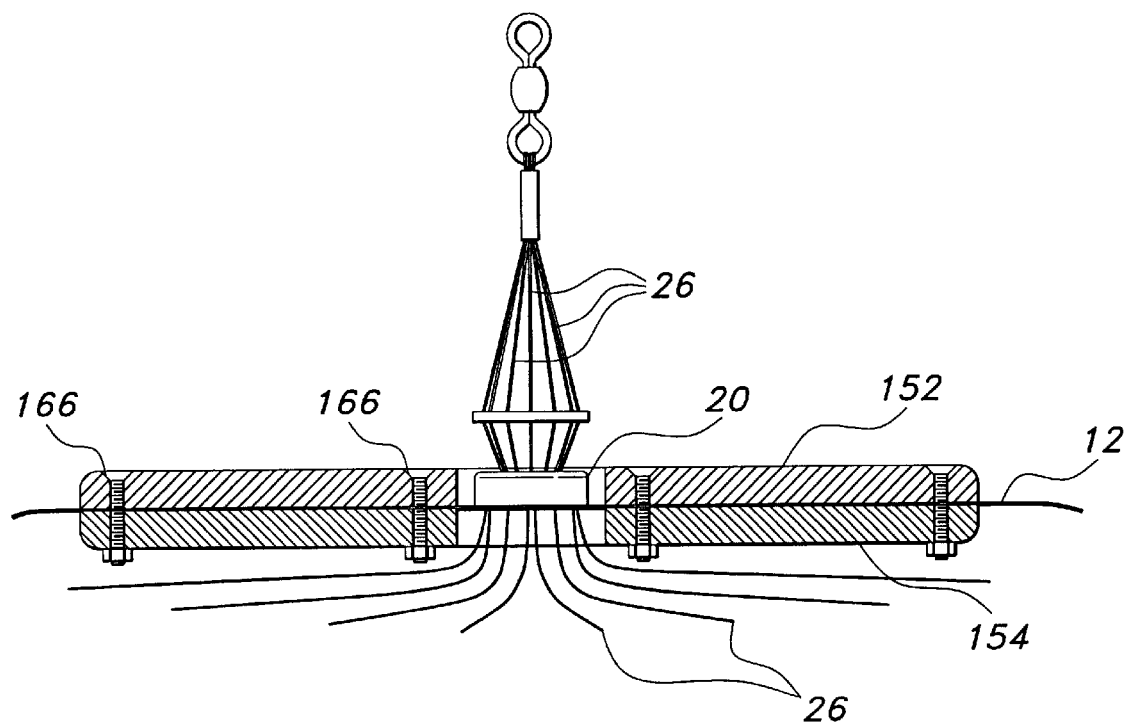
FIG. 21 is a cross-sectional view taken along line 21—21 in FIG. 20.
Figure 22:
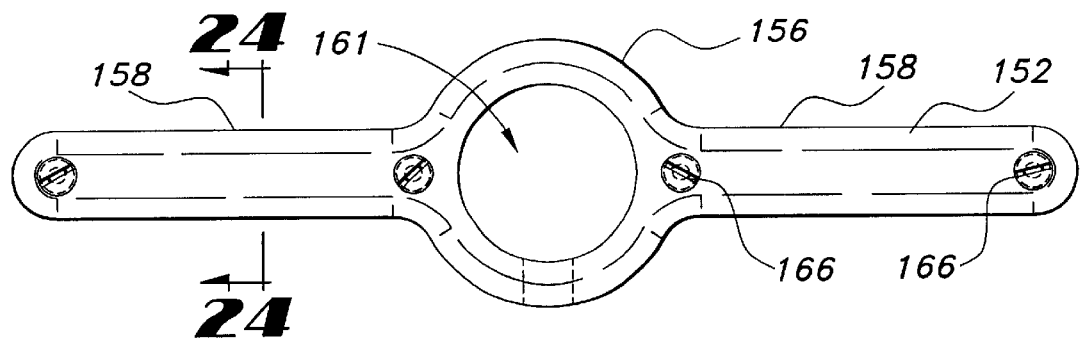
FIG. 22 is a top plan view illustrating the cast net throwing device shown in FIGS. 19 and 20.
Figure 23:
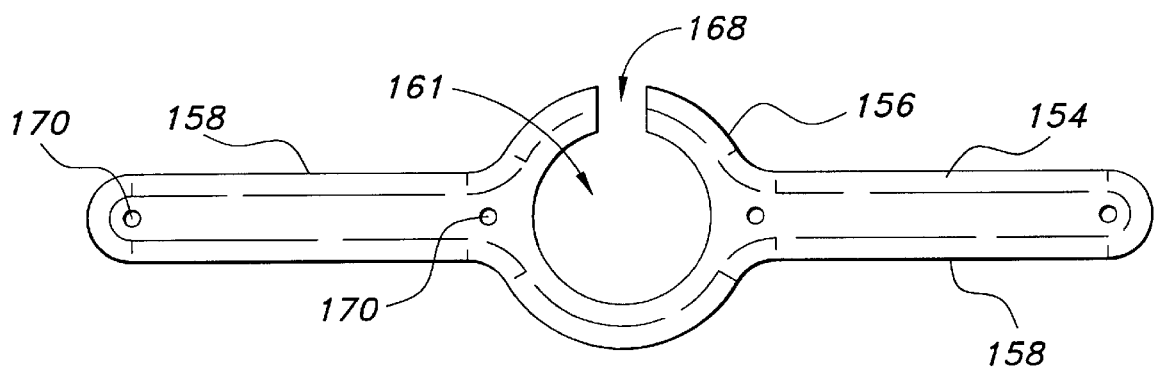
FIG. 23 is a bottom plan view illustrating one of the elongate members of the cast net throwing device shown in FIGS. 19, 20 and 22.
Figure 24:
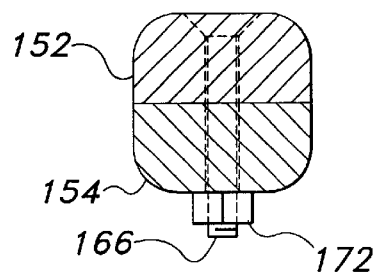
FIG. 24 is a cross-sectional view taken along line 24—24 in FIG. 22.

FIG. 19 is an exploded assembly, perspective view illustrating a cast net throwing device 150, according to a fourth embodiment of the present invention, and a portion of the previously discussed cast net 10. As shown in FIG. 19, the cast net throwing device 150 includes two handle members comprising a first elongate member 152 and a second elongate member 154. Members 152 and 154 are secured to the netting 12 of cast net 10 as subsequently discussed and as illustrated in FIGS. 20 and 21. FIG. 22 is a top plan view further illustrating cast net throwing device 150 and FIG. 23 is a bottom plan view further illustrating elongate member 154. In FIG. 24 is a cross-sectional view further illustrating members 152 and 154.

Elongate member 152 includes a central ring portion 156 and a pair of elongated portions 158 extending outwardly from opposite positions on the central ring portion 156. Although each of the members 152 and 154 include two elongated portions 158 in the illustrative embodiment, members 152 and 154 may include additional elongated portions 158 provided members 152 and 154 have a like number of portions 158 and they are similarly positioned. For instance, by way of illustration and not of limitation, each of the elongated members 152 and 154 may have four substantially equally spaced elongated portions 158 so that members 152 and 154 are generally X-shaped. Each of the elongated portions 158 have a longitudinal length extending from a proximal end of portion 158 which is integral with the central ring portion 156 to a distal end of portion 158 which is sized to permit a user to comfortably grasp one of the elongated portions 158 of member 152 and the mating elongated portion 158 of member 154. Accordingly, the longitudinal length of each of the elongated portions 158 may have a minimum value ranging from about three inches to about five inches. Elongated members 152 and 154 may be made of any of the materials of construction discussed previously with respect to cast net throwing device 50.

The central ring portion 156 of each member 152 and 154 defines a substantially circular aperture 161 extending therethrough. The aperture 161 of member 152 is effective for receiving the throwline 44 therethrough, as well as thimble 20, disk 32 and the portion of the braille lines 26 proximate swivel member 36, as shown in FIGS. 19 and 20. The elongate member 152 includes a first surface 160 having a transverse shape which includes arcuate and substantially flat portions as shown in FIG. 24 and a substantially flat, second surface 162. The elongate member 152 further includes a plurality of apertures 164 extending therethrough, with the apertures 164 including a countersunk portion proximate surface 160, for the purpose for receiving the head of a fastener, such as screw or bolt 166. Elongate member 154 is preferably the same as elongate member 152 with the following exceptions. The central ring portion 156 of elongate member 154 includes a slot 168 extending therethrough, with slot 168 communicating with the aperture 161 extending through member 154. The presence of slot 168 and aperture 161 permits elongate member 154 to be disposed proximate the underneath surface of the netting 12 of cast net 10, since the braille lines 26 of net 10 may be passed through slot 168 and into aperture 161. Accordingly, when the cast net throwing device 150 is secured to cast net 10, the operation of the braille lines 26 is not impeded as best seen in FIG. 21. Another difference between members 152 and 154 is that the member 154 includes a plurality of apertures 170, which preferably comprise straight through clearance holes, in lieu of the apertures 164 of member 152 which include a countersunk portion.

Cast net throwing device 150 is secured to the netting 12 of cast net 10 as follows. Members 152 and 154 are disposed with the substantially flat surface 162 of both of the members 152 and 154 facing the netting 12 of cast net 10. With the elongate member 152 disposed above cast net 10, the throwline 44 is passed through aperture 161 of member 152. Member 152 is then disposed against the upper surface of the netting 12, with the central ring portion 156 being disposed in surrounding relationship with the thimble 20 of the cast net 10. This substantially centers member 152 on cast net 10. The aperture 161 of member 152 is preferably disposed in substantially concentric relationship with the thimble 20 of cast net 10 thereby further facilitating the centering of member 152 on net 10. Member 154 is disposed below cast net 10 and the braille lines 26 are passed through slot 168 into aperture 161 of member 154. Member 154 is then placed against the underneath surface of the netting 12, with the through holes 170 in member 154 being aligned with the apertures 164 extending through member 152. The aperture 161 of member 154 is also disposed in substantially concentric relationship with thimble 20 of cast net 10. Members 152 and 154 are then secured to one another by bolts 166 and nuts 172. As may be appreciated, the inside diameter of aperture 161 must be greater than the outside diameter of thimble 20 of cast net 10, so that thimble 20 may be disposed within aperture 161 of member 152, as shown in FIGS. 21 and 22. When members 152 and 154 have been secured to one another, a portion of the netting 12 of cast net 10 is captured between members 152 and 154. Unlike the previous embodiments, however, the portion of the netting 12 to which the cast net throwing device 150 is secured, does not comprise a substantially annular portion of the netting 12, but instead comprises a portion of netting 12 conforming generally to the shape of surface 162.

Figure 25:
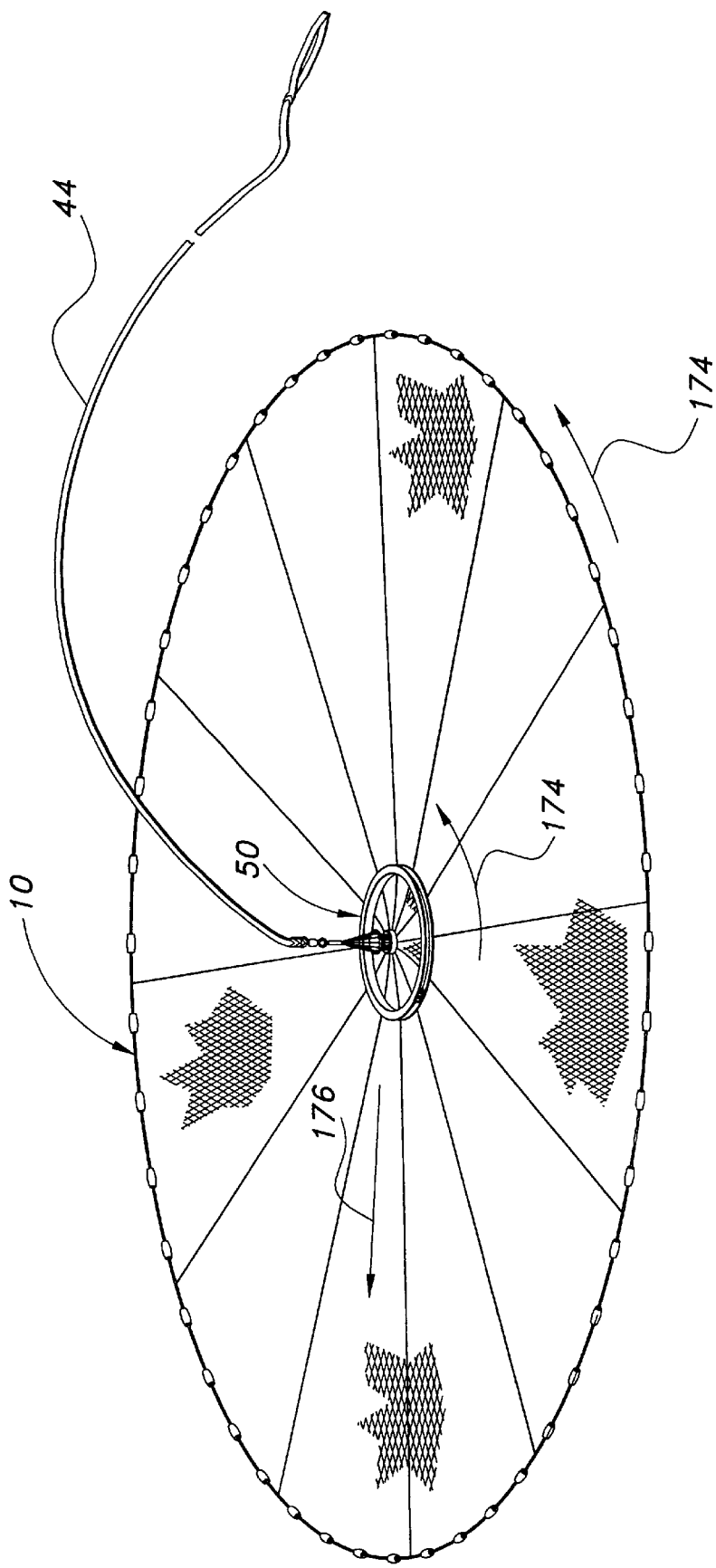
FIG. 25 is a perspective view illustrating one embodiment of the cast net throwing device according to the present invention secured to the cast net shown in FIGS. 1 and 2, illustrating the cast net in flight.

In operation, any of the embodiments of the cast net throwing device according to the present invention significantly enhances the ability to properly cast or throw cast net 10, as subsequently discussed in conjunction with cast net throwing device 50 and FIG. 25. After the cast net throwing device 50 has been secured to cast net 10, the fisherman may grasp the cast net throwing device 50 with one hand, along with the throw line 44. The inventor has determined that it is then useful for the fisherman to grasp a portion of the lead line 15 which corresponds generally to the same "clock" position that the fisherman is grasping on the cast net throwing device. For instance, if the fisherman grasps the cast net throwing device 50 at approximately the six o'clock position, the inventor has observed that it is useful to grasp a portion of the lead line 15 at approximately the six o'clock position. It is noted that good results may also be achieved by varying the position where lead line 15 is grasped over a fairly generous arc, for instance by varying the position where lead line 15 is grasped by as much as about plus or minus forty five degrees. The inventor has further observed that it is then useful to drape the lead line 15 from opposite sides of the fisherman's hand which is holding lead line 15, rope 44 and the cast net throwing device 50. As final preparation, the inventor has observed that it is useful to reposition the portions of lead line 15 which are proximate the location where lead line 15 is being grasped, over the top of the cast net throwing device 50. The fisherman may then turn in a complete or partial circle thereby imparting rotation to the cast net throwing device 50 and the cast net 10 as shown by rotation arrows 174 in FIG. 25. The resulting centrifugal forces, depicted by arrow 176 in FIG. 25, facilitate the opening of the cast net 10 during the cast. Since the throwing device 50 is substantially centered on net 10, the centrifugal forces 176 are substantially evenly distributed throughout net 10. The inventor has determined that grasping the included handle member or members of the cast net throwing device according to the present invention significantly increases the user's ability to spin or sling the cast net during the act of casting, thereby creating centrifugal force which is great enough to cause the entire leadline of the cast net to rotate in a circular motion, thereby causing the cast net to open as it pulls away from the user's body upon release. In this regard, the inventor has observed that incorporation of the cast net throwing device results in greater net rotation during a typical cast, as compared to conventional nets which do not incorporate the cast net throwing device.

While the foregoing description has set forth the preferred embodiments of the present invention in particular detail, it must be understood that numerous modifications, substitutions and changes can be undertaken without departing from the true spirit and scope of the present invention as defined by the ensuing claims. For instance, the cast net throwing device according to the present invention may include one or more handle members having a wide variety of shapes and configurations other than those of the ring or elongate members included in the embodiments disclosed herein, and the handle member or members may be secured to the netting of the cast net differently than as shown in the embodiments illustrated herein, provided: the handle member or members are sized and configured to allow the user to easily grasp the member or members thereby enhancing the user's ability to impart rotation to the cast net during the act of casting the net; the handle member or members of the cast net throwing device are substantially centered on the cast net to which the device is secured; the handle member or members are constructed of water resistant materials which include, but are not limited to, aluminum, stainless steel, other metals and metallic alloys, glass filled nylon such as thirty percent glass filled nylon, plastic materials, composite materials and the like that will substantially retain their characteristics under wet or salty conditions and are sufficiently strong to withstand the centrifugal forces acting upon the cast net throwing device during the act of casting; the handle member or members have sufficient surface area to permit the handle member or members to be secured to the netting of the cast net in such a manner that the handle member or members remain secured to the netting during the act of casting; the cast net throwing device does not interfere with the operation of the braille lines of the cast net to which the device is secured and does not otherwise prevent closing of the cast net; and the cast net throwing device and cast net may sink after impact with the surface of water, when the cast net throwing device is secured to the cast net. The invention is therefore not limited to specific preferred embodiments as described, but is only limited as defined by the following claims.

What is claimed is:

1. A cast net having a throw line, a substantially circular net portion, the circumference of which is defined by a lead line which is secured to the net portion, the center of the net portion defining an apex, a thimble which is located approximate the apex and a plurality of braille lines which slideably pass through the thimble and are connected between the throw line and the lead line, wherein in use the braille lines are drawn through the thimble, the improvement which comprises a circular handle attached to the net portion, wherein the circular handle is centrally disposed on the net portion between the thimble and the lead line, in surrounding relationship to the thimble.

2. The cast net of claim 1 wherein the outer periphery of the circular handle defines an annular groove, and wherein the circular handle is disposed on the inside of the cast net and the net portion is secured in the annular groove with twine.

3. The cast net of claim 1 wherein the circular handle comprises an inner ring and an outer ring which are operably connected to each other and wherein the net portion is secured between said inner and outer rings.

4. The cast net of claim 3 wherein one of said rings incorporates a a female annular groove and the other ring incorporates a male annular projection, and wherein the annular groove and annular projection are adapted to interlock with each other, and the inner and outer rings are operably connected to each other by meshing the annular groove with the opposing annular projection.

5. The cast net of claim 3 wherein the inner and outer rings are operably connected to each other with rivets.

6. The cast net of claim 1 wherein the circular handle comprises an upper ring and a lower ring which are operably connected to each other in a plane which is parallel with the plane of the thimble and wherein the net portion is secured between said upper and lower rings.

7. The cast net of claim 6 wherein the upper and lower rings are operably connected to each other with fasteners.

* * * * *